United States Patent
Chen

(10) Patent No.: US 7,546,513 B2
(45) Date of Patent: Jun. 9, 2009

(54) CIRCUIT AND METHOD FOR CHECKING AND RECOVERING A DISK ARRAY

(75) Inventor: Hung-Pin Chen, Hsin-Tien (TW)

(73) Assignee: Via Technologies Inc., Taipei County (TW)

( * ) Notice: Subject to any disclaimer, the term of this patent is extended or adjusted under 35 U.S.C. 154(b) by 556 days.

(21) Appl. No.: 11/316,936

(22) Filed: Dec. 27, 2005

(65) Prior Publication Data
US 2007/0079221 A1    Apr. 5, 2007

(30) Foreign Application Priority Data
Sep. 9, 2005    (TW) .............................. 94131187 A

(51) Int. Cl.
*H03M 13/00*    (2006.01)
(52) U.S. Cl. .................. 714/758; 714/798; 714/769
(58) Field of Classification Search ................ 714/758, 714/5, 15, 770, 769, 798, 804; 375/355; 713/501
See application file for complete search history.

(56) References Cited

U.S. PATENT DOCUMENTS

| | | | | |
|---|---|---|---|---|
| 4,853,845 A * | 8/1989 | Zimmer et al. | ............... | 713/501 |
| 5,220,569 A * | 6/1993 | Hartness | ...................... | 714/758 |
| 5,490,149 A * | 2/1996 | Nylander-Hill | ................. | 714/5 |
| 5,717,715 A * | 2/1998 | Claydon et al. | ............. | 375/220 |
| 5,721,816 A * | 2/1998 | Kusbel et al. | .................. | 714/15 |
| 6,043,946 A * | 3/2000 | Genheimer et al. | ........... | 360/53 |
| 6,463,109 B1 * | 10/2002 | McCormack et al. | ........ | 375/355 |

* cited by examiner

*Primary Examiner*—Esaw T Abraham
*Assistant Examiner*—Fritz Alphonse
(74) *Attorney, Agent, or Firm*—Rosenberg, Klein & Lee

(57) ABSTRACT

The present invention is provided for producing check data or recovery data in a disk array. According to the present invention, a plurality of buffers receives and stores the data respectively for a plurality of operation units to perform operations to produce check data. An output selector selects one of the buffers and sends the check data to the coupled disk drive. When recovering the data in a disk drive, by using the buffers coupled to the other disk drives, the data or the check data stored in the other disk drives are sent to the operation units to perform operations on the data and the check data to produce recovery data. The recovery data is then sent to the disk drive to be recovered by selecting the buffer coupled to the disk drive to be recovered via the output selector. In addition, the buffers can be coupled to a plurality of input selectors, which are used for selecting to send data in one of the buffers to the coupled operation units.

21 Claims, 6 Drawing Sheets

CIRCUIT AND METHOD FOR CHECKING AND RECOVERING A DISK ARRAY

FIELD OF THE INVENTION

The present invention relates generally to a circuit and a method for checking and recovering the data of a disk array, and more particularly to the circuit and the method for checking and recovering a disk array that will not affect the performance of the central processing unit while producing check data or recovery data, and the circuit is so simple that the installation cost is effectively reduced.

BACKGROUND OF THE INVENTION

With the advent of the information era, the data stored in a computer system increases day by day. The hard disk drives used for storing data accordingly continue to expand in storage capacity, and have progressed from single disk to multiple disks. Nevertheless, the price of hard disk drives is proportional to its storage capacity. That is, the more the storage capacity is, the more expensive it costs with less fault-tolerating. Therefore, a virtual large-scale disk drive comprising of a plurality of independent disk drives such as a redundant array of independent disks (RAID), called a disk array, is developed for the purpose. By using the disk array, the performance of data storage is enhanced, and the disk arrays are provided with debugging capabilities. When a disk drive is damaged, it is only necessary to replace the drive with one that functions normally, and then the data stored in the damaged disk drive can be recovered later.

A fault-tolerating disk array is able to perform the operations to produce check data while storing data to disk drives, and then stores the produced check data to the disk drives. When a disk drive is damaged, by performing operations on the data stored in other disk drives and on the check data, the original data in the damaged disk drive can be recovered, and can thus be stored back to the newly replaced disk drive. Most of the fault-tolerating disk array technologies nowadays use a central processing unit to perform operations on data to produce check data. In this way, the performance of the central processing unit and the computer system will be affected. In addition, because the data has to be read from memories or disk drives when the central processing unit produces check data or recovery data, and then the check data or the recovery data have to be stored back to the disk drives, which will consume lots of time.

Due to the problems described above, nowadays a separate input/output processor for disk arrays is developed to perform the operations for producing the check data as well as the recovery data. However, the separate input/output processor is expensive, and memory support is necessary when the processor is employed. Therefore, the effects for employing the independent processor are limited for those applications whose hardware cost has to be reduced.

By summarizing foregoing problems, the present invention proposes a circuit and a method for checking and recovering a disk array that will not affect the performance of the central processing unit while producing check data or recovery data, and the circuit is so simple that the hardware cost is effectively reduced to solve the foregoing problems.

SUMMARY OF THE INVENTION

The main object of the present invention is to provide a circuit and a method for checking and recovering a disk array that will not affect the performance of the central processing unit while producing check data and recovery data.

Another object of the present invention is to provide a circuit and a method for checking and recovering a disk array, on which the circuit is simple for checking and recovering so that the hardware cost of installation in computer systems can be reduced and the method is simple so that the performance of checking and recovering data can be enhanced.

The circuit for checking and recovering a disk array according to the present invention comprises a plurality of buffers, a plurality of input selectors, a plurality of operation units, and an output selector. Each of the plurality of buffers couples to one of the disk drives respectively. The method for checking and recovering a disk array according to the present invention is that the plurality of buffers receive and temporarily store data, and then each of the plurality of input selectors coupled with the plurality of buffers selects the data in one of the buffers to be sent to the operation unit that is coupled to the input selector respectively. The data sent by the plurality of input selectors coupled to the plurality of operation units are received by the plurality of operation units, which are connected in series. The data are further processed to produce the check data, and then sent to the output selector in order to select one of the buffers to which the check data is to be sent. Then the check data is sent to the disk drive coupled with the selected buffer. Moreover, when the data in a disk drive is to be recovered, the buffers coupled with other disk drives receive, store the data and the check data stored in the disk drives, on which the data or check data are then sent to the coupled operation units by using the input selectors in order to perform operations on the data and the check data to produce recovery data. The produced recovery data is sent to the output selector in order to select the buffer coupled with the disk drive to be recovered, and then the recovery data is sent to the disk drive to be recovered.

The present invention further provides a circuit and a method for checking and recovering, which is different from the foregoing circuit and method in that the plurality of input selectors are not included. The buffers are directly coupled to the operation units respectively. The method for checking and recovering is to receive and store data by a plurality of buffers for the operation units to perform operations and to produce the check data. The check data is then sent to the output selector to select the check data to be sent to a buffer, so that the check data can be sent to the disk drive coupled with the selected buffer. When recovering the data in a disk drive, the buffers coupled with other disk drives receive and store the data or the check data stored in the disk drives in order to let the operation units perform the operations to produce the recovery data. The produced recovery data is sent to the output selector in order to select the buffer coupled with the disk drive to be recovered, and then the recovery data is sent to the disk drive to be recovered.

In order to make the structure, features, and the effectiveness achieved of the present invention further understood and recognized, the detailed description of the present invention is provided as follows along with preferred embodiments and accompanying figures.

DETAILED DESCRIPTION OF THE PREFERRED EMBODIMENTS

Figure 1:
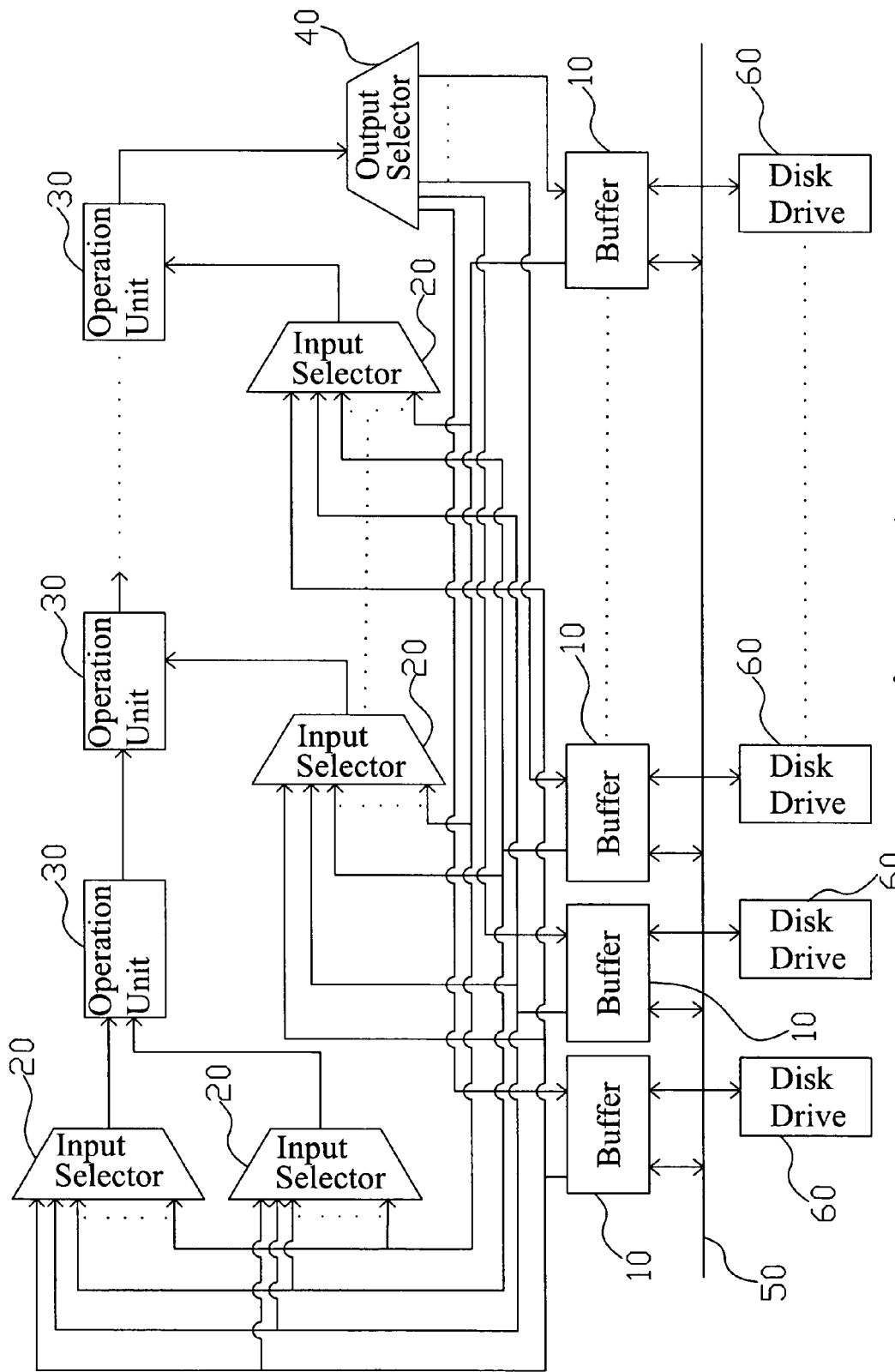
FIG. 1 shows the block diagram of a circuit in a preferred embodiment according to the present invention.

Please first refer to FIG. 1, which shows a block diagram of the circuit in a preferred embodiment according to the present invention. As shown in the figure, the circuit for checking and recovering data comprises a plurality of buffers 10, a plurality of input selectors 20, a plurality of operation units 30, and an output selector 40. The buffers 10 can be first-input-first-output (FIFO) buffers used to receive and store data. Each of the buffers 10 is coupled to a bus 50, and each of the buffers 10 is coupled respectively to a disk drive 60 of a disk array, and is used to select sending the stored data in any of the buffers 10. The input selector 20 can be a multiplexer.

Each of the operation units 30 is connected in series each other and is coupled to the input selector 20. The operation units 30 are logic operation units of Exclusive-OR gates used to perform operations on the data selected by the input selectors 20 for sending and producing check data or recovery data. The produced check data or recovery data will be sent to the output selector 40 used to select a buffer 10 to which the data is sent; the output selector 40 can be a demultiplexer and the check data is parity check data. Thereby, the check data or the recovery data can be sent to a designated disk drive 60. The circuit for checking and recovering data can be integrated directly into a Southbridge chip of a computer system, and the buffers 10 can be replaced by the FIFO buffers included in the Southbridge chip. Therefore, the installation cost can be lowered, and the performance of the central processing unit of the computer system will not be affected while producing the check data or the recovery data. Meanwhile, because the circuit according to the present invention can be integrated into the Southbridge chip, the read time and the write time of data access can be shortened to improve operation performance.

Figure 2A:
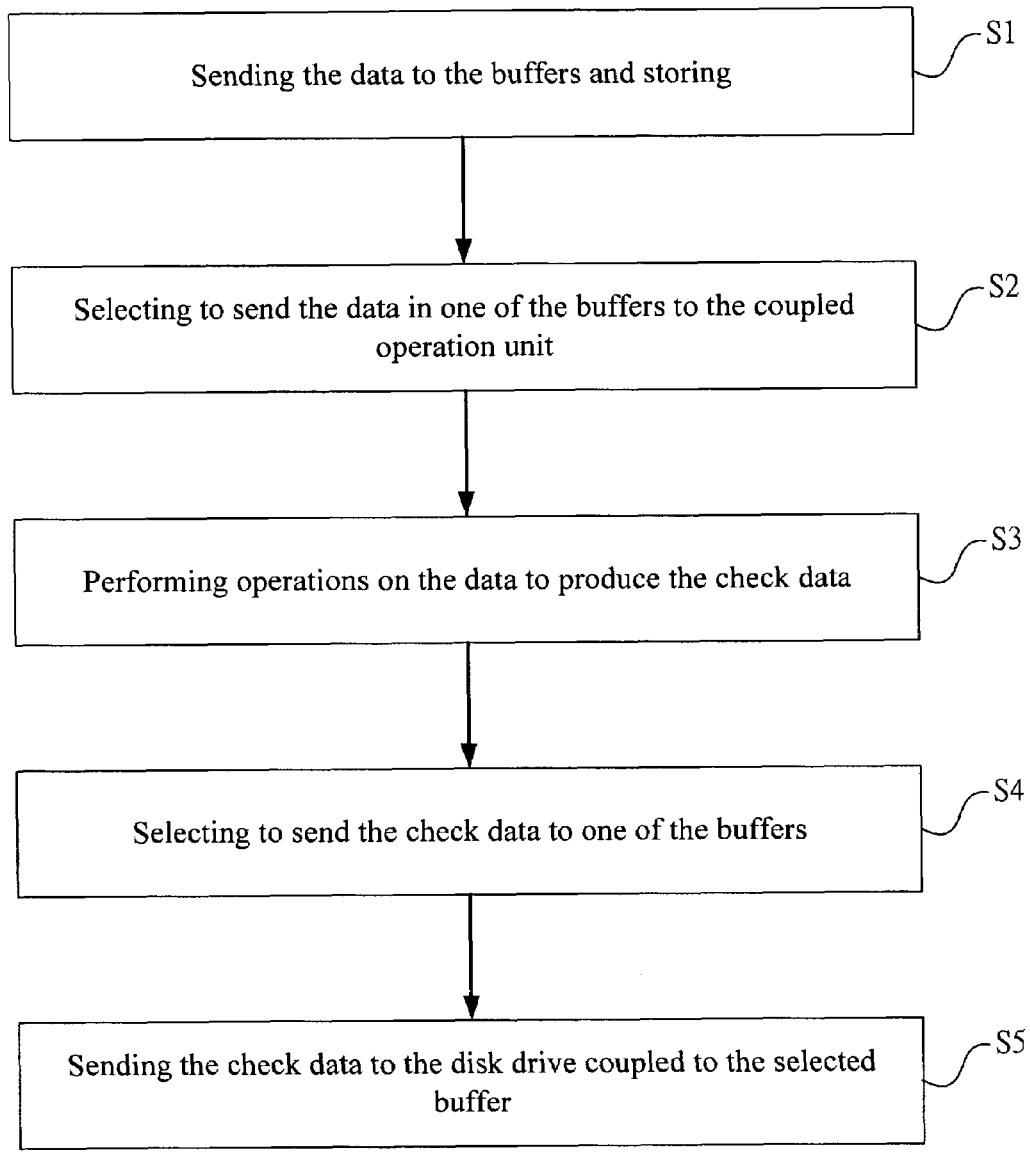
FIG. 2A shows the flowchart of producing check data in a preferred embodiment according to the present invention.

Please refer to FIG. 2A, which shows the flowchart of producing check data in the preferred embodiment according to the present invention. When data is to be stored to the disk drives 60 of the disk array, the data partitioned into multiple chunks of data and sent respectively to different disk drives 60 will be sent to the circuit for checking and recovering according to the present invention so that the check data is produced and stored in the disk drives 60 of the disk array. If the disk array is RAID Level 3 or RAID Level 4, the check data will be stored in a specific disk drive while the partitioned multiple chunks of data are stored in the remaining disk drives. On the other hand, if the disk array is RAID Level 5, the check data and the partitioned multiple chunks of data will be stored distributively in different disk drives. That is, the check data is not stored in a specific disk drive.

First, as shown in the step S1, the data is partitioned into multiple chunks of data and is sent to and stored in each of the buffers 10 respectively via the bus 50. Next, each of the input selectors 20, as shown in the step S2, selects the data stored in one of the buffers 10 to send to the coupled operation unit 30, so that the step S3 can be executed to perform operations on the data to produce the check data corresponding to the data, and to send the check data to the output selector 40. Then, the output selector 40 executes the step S4 to select sending the check data to one of the buffers 10, so that the check data can be stored in a buffer 10. The buffer 10 and the disk drive 60 used for storing the check data are connected together. Afterwards, the step S5 is executed so that the check data is sent to and stored in the coupled disk drive 60.

The foregoing action of sending multiple chunks of data respectively to each of the buffers 10 via the bus 50 sends the multiple chunks of data to the buffer 10 coupled with the desired disk drive 60 respectively for storing the data in chunks. That is, the buffer 10 that receives no chunk of data is coupled to the disk drive 60 used for storing the check data of the data. Thereby the output selector 40 will send the check data produced by the operation units 30 to the buffer 10 that receives no chunk of data, so that the check data can be sent to the disk drive 60 used for storing the check data.

Figure 2B:
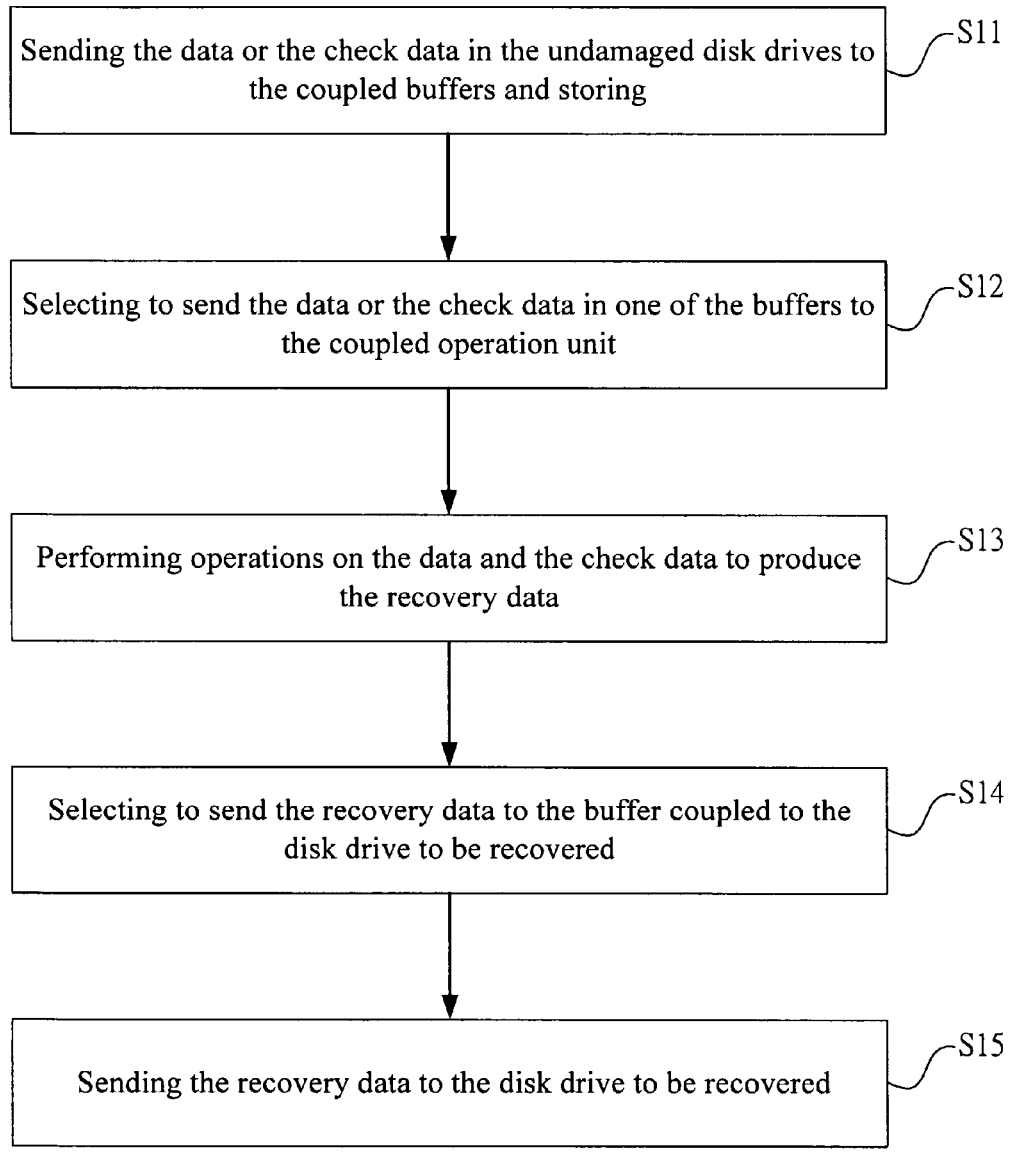
FIG. 2B shows the flowchart of producing recovery data in a preferred embodiment according to the present invention.

Please continue to refer to FIG. 2B, which illustrates the scenario of performing recovery by the circuit. When data in one of the disk drives 60 of the disk array is failed to be read, the disk drive is replaced by a normal disk drive 60. First, as shown in the step S11, the buffers 10 coupled to the undamaged disk drives 60 receive and store the data, or the check data in the undamaged disk drives 60. Next, each of the input selectors 20 executes the step S12 to select individually to send the data or the check data stored in one of the buffers 10 to the coupled operation unit 30, so that the step S13 can be executed by the operation units 30 to perform operations on the data and the check data to produce the recovery data, and to send the recovery data to the output selector 40. Next, the output selector 40 executes the step S14 to select sending the recovery data to the buffer 10 coupled to the replaced disk drive in which the data to be recovered, so that the step S15 can be executed to store the recovery data in the replaced disk drive. The input selectors 20 and the output selector 40 mentioned above can be configured and controlled by software so that the data can be selected to send to the operation unit 30, and the check data or the recovery data produced by the operation units 30 can be selected to send to a buffer 10 and to store in the disk drive 60 coupled to the buffer 10.

Figure 3:
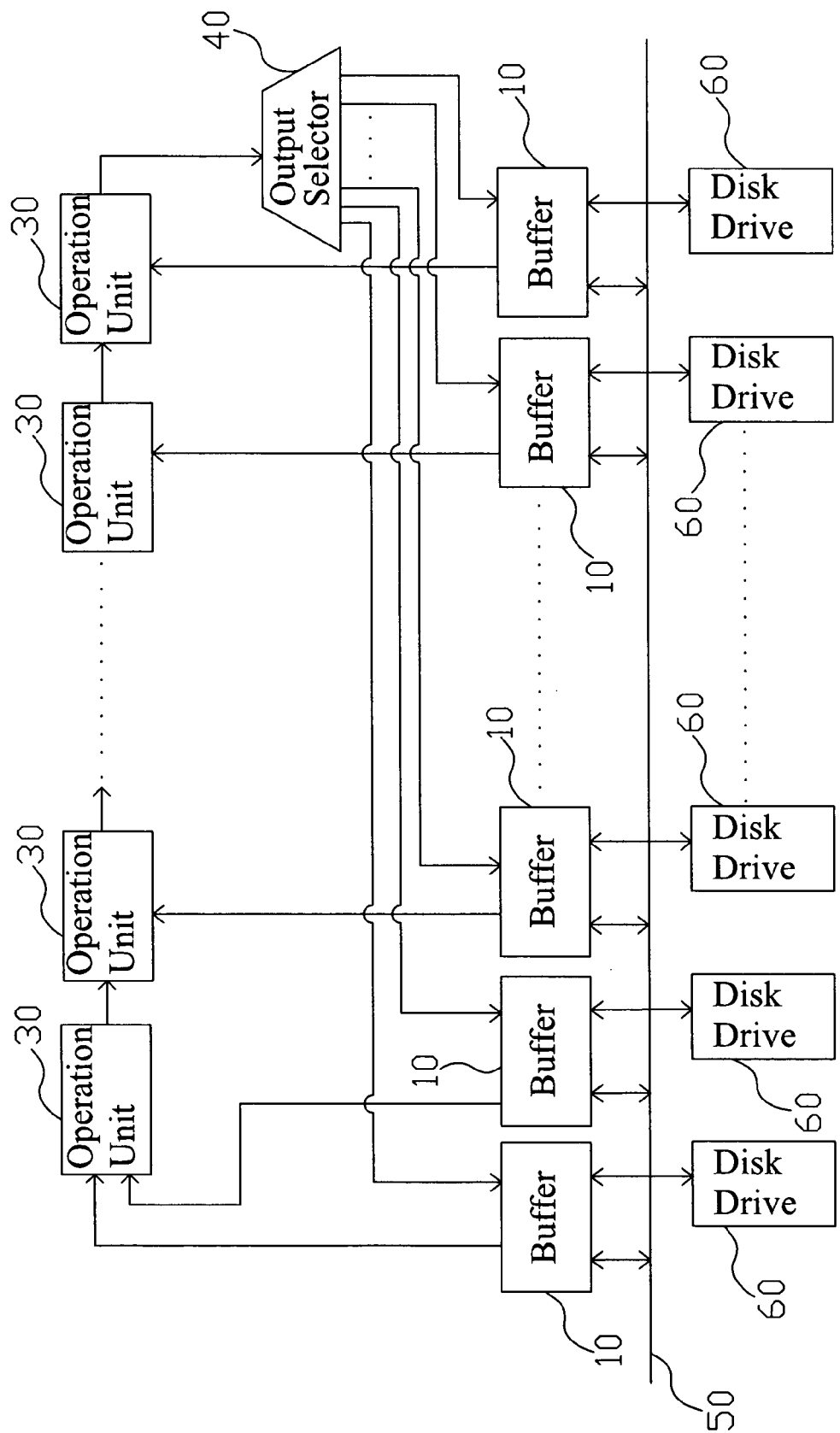
FIG. 3 shows the block diagram of the circuit in another preferred embodiment according to the present invention.
Figure 4A:
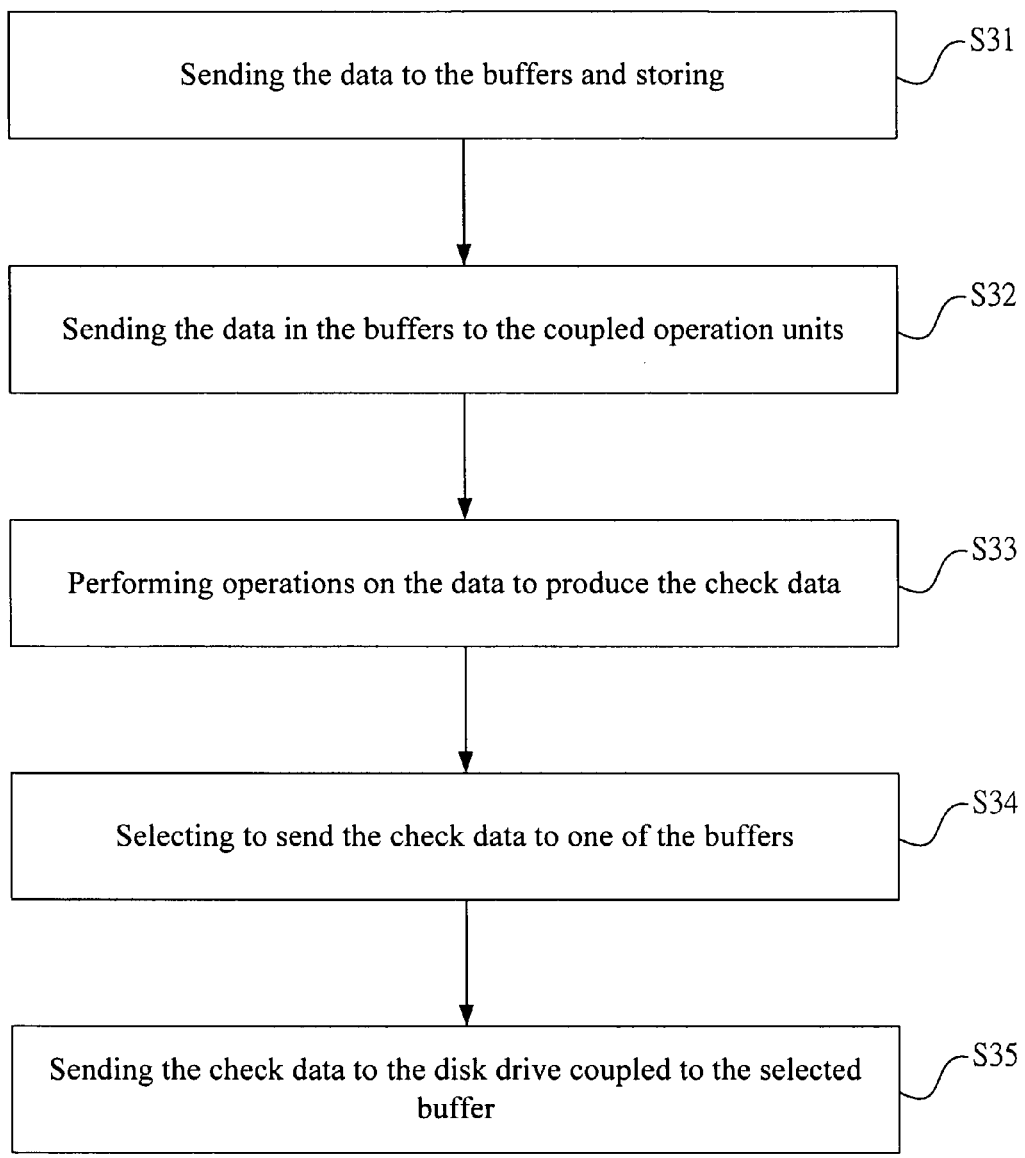
FIG. 4A shows the flowchart of producing check data in another preferred embodiment according to the present invention.

Please refer to FIG. 3, which shows a block diagram of another preferred embodiment according to the present invention. As shown in the figure, the present preferred embodiment is different from the foregoing preferred embodiment in that the input selectors 20 are not included in the preferred embodiment, and that each of the buffers 10 is coupled directly to the operation unit 30. The rest parts of the preferred embodiment are the same as those in the foregoing one. Thereinafter, the detailed actions of producing the check data according to the preferred embodiment in FIG. 3 are explained accompanying FIG. 4A. First, when chunks of data are stored to the disk drives 60 in a disk array; similarly, they will be sent respectively to the buffers via the bus 50. That is, the buffers 10, as shown in the step S31, receive and store the data. Next, the step S32 is executed by the buffers 10 to send the data stored to the coupled operation units 30, so that the step S33 can be executed by the operation units 30 to perform operations on the data to produce the check data, and to send the check data to the output selector 40. Then, the output selector 40 executes the step S34 to select sending the check data to one of the buffers 10, which is the buffer 10 coupled to the disk drive 60 used for storing the check data. Subsequently, the step S35 is executed so that the check data is sent to the disk drive 60 coupled to the selected buffer 10, which disk drive 60 is also the one used for storing the check data.

Figure 4B:
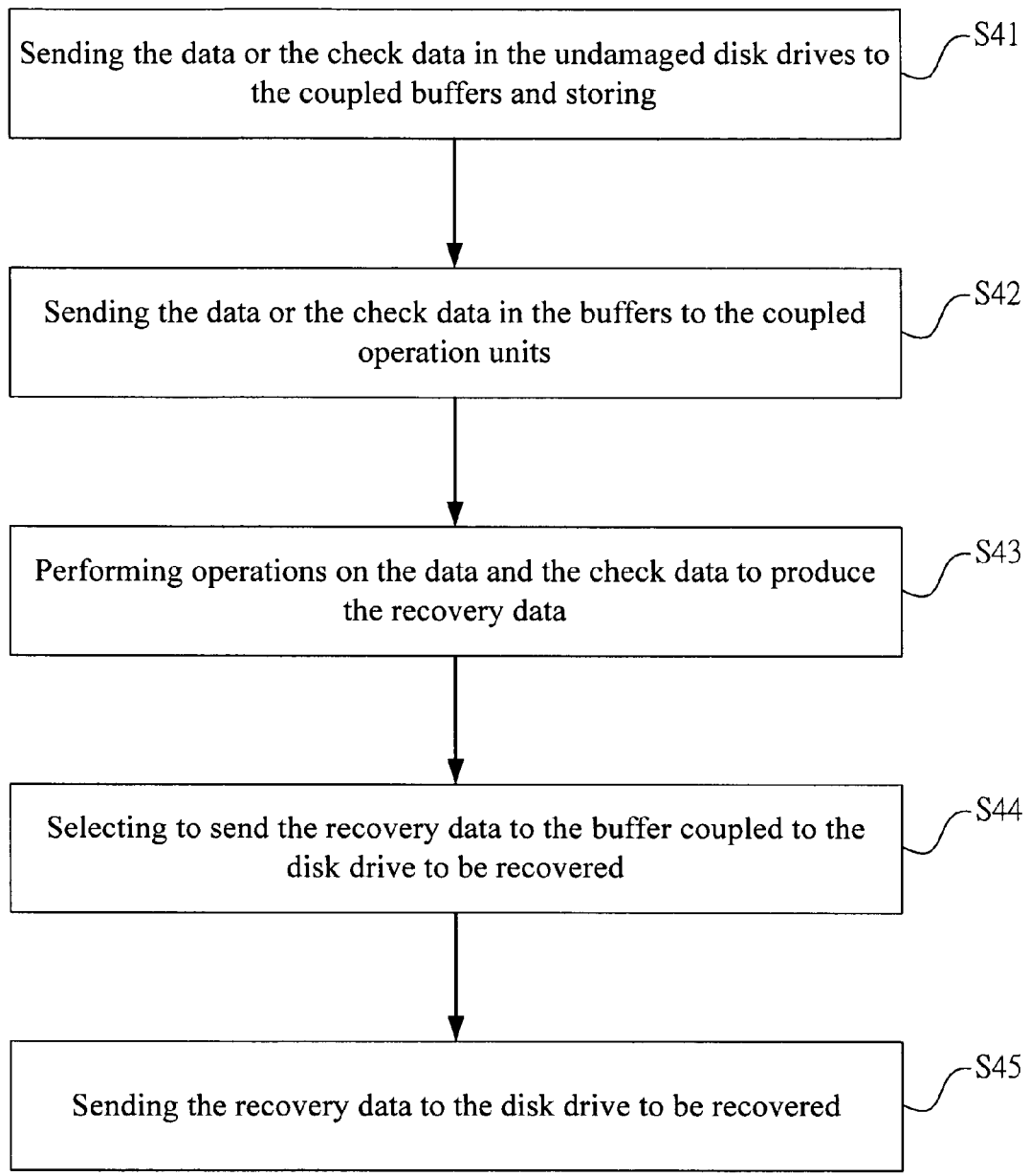
FIG. 4B shows the flowchart of producing recovery data in another preferred embodiment according to the present invention.

Please continue to refer to FIG. 4B, which shows a flowchart of producing recovery data in the preferred embodiment according to FIG. 3. When one of the disk drives 60 in the preferred embodiment according to FIG. 3 is damaged, it will be replaced by a normal disk drive 60 in order to recover the data in the damaged disk drive 60. First, as shown in the step S41, the data or the check data stored in the undamaged disk drives 60 is received and stored respectively via the buffers 10 coupled to the undamaged disk drives 60. Next, as shown in the step S42, the data or the check data stored in the buffers 10 is respectively sent to the operation units 30 so that the step S43 can be executed by the operation units 30 to perform operations on the data and the check data to produce the recovery data, and send the recovery data to the output selector 40. Then, the step S44 is executed to select sending the recovery data to the buffer 10 coupled to the disk drive 60 to be recovered. Finally, the step S45 is executed to send the recovery data to the disk drive 60 to be recovered. The present preferred embodiment, compared to the previous preferred embodiment, costs less and occupies less area for the circuit of checking and recovering according to the present invention, because the input selectors 20 are not necessary to be included in the present preferred embodiment.

To sum it up, the circuit and the method for checking and recovering a disk array according to the present invention is a simple. The circuit and the method can perform operations on the data to produce the check data. When one of the disk drives is damaged, the circuit and the method can perform operations on the data and the check data stored in undamaged disk drives to produce the check data. It is not necessary to perform operations by the central processing unit or to separately install expensive separate input/output processors in order to produce the check data and the recovery data mentioned above. Thus, the performance of the central processing unit will not be affected; moreover, the hardware costs are significantly reduced. In addition, because the present invention can be integrated directly into a Southbridge chip, the read time and the write time of data can be shortened to improve operation performance.

Accordingly, the present invention conforms to the legal requirements owing to its novelty, unobviousness, and utility. However, the foregoing description is only a preferred embodiment of the present invention, which is not used to limit the scope and range of the present invention. Those equivalent changes or modifications made on the shape, structure, feature, or spirit described in the claims of the present invention should also be included in the claims of the present invention.

The invention claimed is:

1. A circuit for checking and recovering data from a plurality of disk drives in a disk array, comprising:
   a plurality of buffers for receiving and storing data, each of the buffers being coupled to a respective one of the plurality of disk drives in the disk array;
   a plurality of input selectors, each input selector having a plurality of inputs respectively coupled to the plurality of buffers for selectively sending the data in one of the buffers to an output of the input selector;
   a plurality of operation units coupled in series one after another, each operation unit being coupled to the output of at teast one of the input selectors for receiving the data sent by the input selectors, the plurality of operation units performing operations on the data to produce check data; and
   an output selector for receiving the check data and having a plurality of outputs respectively coupled to the plurality of buffers to select one of the buffers to send the check data to the disk drive coupled to the selected buffer;
   wherein when recovering the data in a disk drive to be removed, the buffers coupled to other disk drives receive and store the data or the check data, the data or the check data we sent to the coupled operation units to produce recovery data via the input selectors, and the recovery data are sent to the output selector to select the buffer coupled to the disk drive to be recovered so that the recovery data are sent to the disk drive to be recovered.

2. The circuit of claim 1, wherein the check data is parity check data.

3. The circuit of claim 1, wherein the buffer is a first-input-first-output (FIFO) buffer.

4. The circuit of claim 1, wherein the input selector and the output selector are controlled by software.

5. The circuit of claim 1, wherein the input selector is a multiplexer, and the output selector is a demultiplexer.

6. The circuit of claim 1, wherein the operation unit is a logic operation unit of Exclusive-OR gates.

7. The circuit of claim 1, wherein the disk array is one of a RAID Level 3, a RAID Level 4 and a RAID Level 5.

8. The circuit of claim 1, wherein the circuit is integrated into a Southbridge chip of a computer system.

9. The circuit of claim 1, wherein the selected buffer selected by the output selector is one buffer that receives no data from the plurality of disk drives.

10. A circuit for checking and recovering data from a plurality of disk drives in a disk array comprising:
    a plurality of buffers for receiving and storing data, each of the buffers being coupled to a respective one of the plurality of disk drives in the disk array;
    a plurality of operation units coupled in series one after another, each operation unit being coupled to the output of at least one of the buffers for receiving the data in the buffers, the plurality of operation units and performing operations on the data to produce check data; and
    an output selector for receiving the check data and having a plurality of outputs respectively coupled to the plurality of buffers to select selecting one of the buffers to send the check data to the disk drive coupled to the selected buffer;
    wherein when recovering the data in a disk drive to be removed, the buffers coupled to other disk drives send the data or the check data to the coupled operation units to produce recovery data, and the recovery data are sent to the output selector to select the buffer coupled to the disk drive to be recovered so that the recovery data are sent to the disk drive to be recovered.

11. The circuit of claim 10, wherein the check data is parity check data.

12. The circuit of claim 10, wherein the buffer is a first-input-first-output (FIFO) buffer.

13. The circuit of claim 10, wherein the each operation unit is a logic operation unit of Exclusive-OR gates.

14. The circuit of claim 10, wherein the output selector is a demultiplexer.

15. The circuit of claim 10, wherein the output selector is controlled by software.

16. The circuit of claim 10, wherein the disk array is one of a RAID Level 3, a RAID Level 4, and a RAID Level 5.

17. The circuit of claim 10, wherein the circuit is integrated in a Southbridge chip of a computer system.

18. A method for checking and recovering data from a plurality of disk drives in a disk array, each disk drive being coupled to a respective buffer of a plurality of buffers, comprising:
    sending data from the disk drives to the buffers respectively for storing;
    performing operations on the data to produce check data;

selecting to send the check data to one of the buffers to send the check data to the selected buffer, wherein the selected buffer is one buffer that receives no data from the disk drives; and sending the check data to the disk drive coupled to the selected buffer;

wherein when recovering the data in a disk drive to be recovered, the buffers coupled to other disk drives receive and store the data or the check data for performing operations on the data and the check data to produce recovery data, and the recovery data are sent to the buffer coupled to the disk drive to be recovered so that the recovery data are sent to the disk drive to be recovered.

19. The method of claim 18, wherein the step of performing operations on the data to produce check data is performing Exclusive-OR logic operations.

20. The method of claim 18, wherein the check data is parity check data.

21. The method of claim 18, wherein the disk array is methed one of a RAID Level 3, a RAID Level 4, and a RAID Level 5.

* * * * *